Aug. 28, 1923.
R. G. BACHMAN
WATERPROOF BUILDING MATERIAL
Filed July 31, 1922
1,466,462
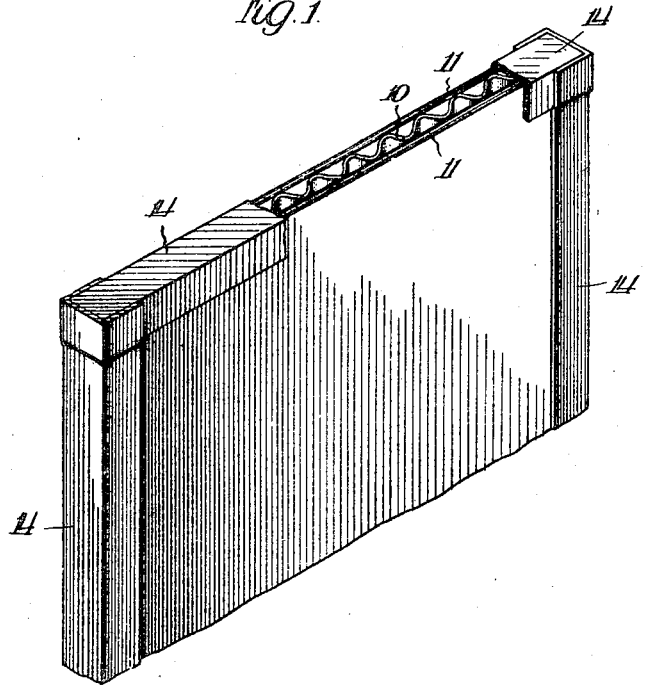
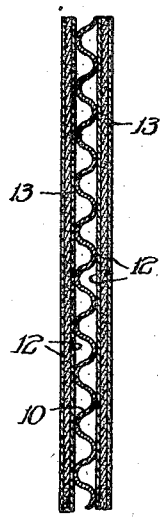

Patented Aug. 28, 1923.

1,466,462

UNITED STATES PATENT OFFICE.

ROY G. BACHMAN, OF CHICAGO, ILLINOIS.

WATERPROOF BUILDING MATERIAL.

Application filed July 31, 1922. Serial No. 578,770.

*To all whom it may concern:*

Be it known that I, ROY G. BACHMAN, a citizen of the United States, residing at Chicago, in the county of Cook and State of Illinois, have invented certain new and useful Improvements in Waterproof Building Materials, of which the following is a specification.

The present invention relates to waterproof building material.

It has been common practice to treat sheet building material, such as strawboard, by coating or saturating same with fluid waterproofing material. This practice is open to objection in instances where it is desirable to retain the capillary attraction of the building material, as, for example, where said building material is used as the base for plastic material, such as plaster or stucco.

One object of the present invention is to provide an improved building material of the nature of paperboard or strawboard, said building material being of a cellular nature whereby to be capable of a capillary attraction for securing a satisfactory bond between said cellular material and plaster or stucco, the building material having the advantage that the penetration of water therethrough is effectually resisted.

A further object is to provide building material of the nature of corrugated board, which will effectually resist the ingress of water, but will retain the desirable feature of capillary attraction so as to provide a good bond.

Other objects of the invention will appear as the description proceeds.

Referring to the drawings:

Figure 1 is a perspective view illustrating one embodiment of the present invention; and Figure 2 illustrates a detail of construction.

Referring to the preferred manner in which the present invention is carried out, a layer of corrugated board, indicated by the numeral 10, is provided, which corrugated board is faced on its two sides by layers 11—11 of flat board. The material of which the members 10 and 11 are composed may be pulpboard, strawboard, or similar material well known for building purposes. In practice it will be found advisable to have at least one of the members 11 of cellular material.

Each of the layers 11—11 is made up of plies of paper, straw, or other board, indicated by the numerals 12—12. The plies 12—12 may be fastened together by means of a waterproof adhesive 13, such as asphaltum. Or the waterproof material may be incorporated in said plies during the process of manufacture of the paper. Though a portion of the pores or cells of the plies 12—12 is filled with waterproof material, the outwardly facing surface of the layers 11—11 should be free of said waterproof material in order that the capillary attraction thereof shall not be substantially impaired. Such capillary attraction is useful in securing the so-called suction when plastic material, such as plaster or stucco, is applied. By reason of this capillary attraction a satisfactory bond is obtained between such plastic material and the layers 11—11.

According to the present invention, not only is the corrugated board 10 protected against ingress of water through the layers 11—11, but the edges and sides of the strips of building material may be protected as well. The numerals 14—14 indicate strips of tape applied around the entire outline of a strip of building material according to the present invention. Said tape may be waterproofed in any preferred way and may be attached by means of any suitable adhesive.

It will be clear that the building material herein described resists ingress of water not only through the sides thereof, but through the side edges and ends thereof. The tape 14 has the added function of closing the passageways along the corrugated member 10, thereby improving the sound proofing and the insulating properties of the material.

Many modifications of the present invention may occur to those skilled in the art. It is intended in this patent to cover all such modifications that come within the scope of the invention as defined by the appended claims.

I claim:

1. Building material comprising corrugated board having flat layers applied to the two sides thereof, each of said layers comprising plies, said plies having operatively associated therewith waterproof material, the outermost of said plies having a substantial part of the thickness thereof free of said waterproof material, whereby the property of capillary attraction thereof is retained.

2. Building material comprising corrugated board having flat layers mounted upon the two sides thereof, the side and end edges of said board being provided with waterproof tape to prevent ingress of water.

3. Building material comprising material made up of plies, said plies having operatively associated therewith waterproof material, the outermost of said plies having a substantial part of the thickness thereof free of said waterproof material, whereby the property of capillary attraction thereof is retained.

4. Building material comprising a sheet of corrugated board faced on its two sides with flat sheets, each of said flat sheets comprising plies of which the outer consists of material having the property of capillary attraction, said plies having operatively associated therewith waterproof material, said building material being provided with waterproof tape attached to its side and end edges to prevent the ingress of water.

Signed at Chicago, Illinois, this 21st day of July, 1922.

ROY G. BACHMAN.